United States Patent [19]

Farcasiu

[11] 4,317,712

[45] Mar. 2, 1982

[54] CONVERSION OF HEAVY PETROLEUM OILS

[75] Inventor: Malvina Farcasiu, Princeton, N.J.

[73] Assignee: Mobil Oil Corporation, New York, N.Y.

[21] Appl. No.: 254,330

[22] Filed: Apr. 14, 1981

Related U.S. Application Data

[63] Continuation-in-part of Ser. No. 144,803, Apr. 29, 1980, abandoned.

[51] Int. Cl.$^3$ ............................................... C10G 11/08
[52] U.S. Cl. ...................................... 208/46; 208/117; 585/474
[58] Field of Search ................... 585/474; 208/46, 117

[56] References Cited

U.S. PATENT DOCUMENTS

| | | | |
|---|---|---|---|
| 3,844,931 | 10/1974 | Ishiguro et al. | 208/46 |
| 3,928,171 | 12/1975 | Yan et al. | 208/46 |
| 4,117,020 | 9/1978 | Sun | 585/474 |

*Primary Examiner*—Curtis R. Davis
*Attorney, Agent, or Firm*—M. G. Gilman; C. J. Speciale; V. J. Frilette

[57] ABSTRACT

Heavy petroleum oils, such as vacuum resids, and heavy fractions of tar sands and shale oil, are partially converted to more volatile hydrocarbons by mixing with light aromatic hydrocarbons and treatment of the mixture with a Friedel-Crafts catalyst such as aluminum chloride. It is believed that the conversion found is essentially a transalkylation, i.e. the resid undergoes dealkylation with concurrent alkylation of the light aromatic hydrocarbon.

17 Claims, No Drawings

CONVERSION OF HEAVY PETROLEUM OILS

CROSS REFERENCE TO RELATED APPLICATIONS

This application is a continuation-in-part of copending U.S. patent application Ser. No. 144,803 filed Apr. 29, 1980 and now abandoned.

BACKGROUND OF THE INVENTION

1. Field of the Invention

This invention is concerned broadly with petroleum oils such as: ordinary atmospheric and vacuum residua; the substantially nondistillable fractions of oil or solids derived from other petroliferous sources such as oil shale and tar sands; and with other naturally occurring heavy oils which are not amenable to atmospheric pressure distillation without substantial decomposition. In particular, this invention is concerned with the treatment of such a nonvolatile oil to convert a substantial fraction of it to volatile hydrocarbons, and simultaneously to convert the remaining residual fraction to an oil more amenable to upgrading than the untreated, original nonvolatile oil.

2. Prior Art

Commercial petroleum crude oils usually are distilled to recover light fractions which are useful, either with or without further processing, as gasoline, naphtha, kerosine, heating oil and the like. During the distillation, a gas oil fraction boiling from about 415° F. (213° C.) to about 650° F. (340° C.) may sometimes be recovered, and this fraction is used for catalytic cracking to form high grade gasoline and fuel oil. A general treatment of commercial distillation practice is found in "Petroleum Refinery Engineering" by W. L. Nelson, 4th ed., McGraw-Hill Book Company, Inc., New York, N.Y., 1958, in Chapter VII, pages 226-262, which text is incorporated herein by reference in order to furnish background material.

In general, petroleum oils distilled at atmospheric pressure undergo fairly extensive and undesirable decomposition when the distillation temperature exceeds about 680° F. (300° C.). For this reason, atmospheric pressure distillations are conducted to a cut point of about 650° F. (340° C.) for the heaviest volatile fraction, everything distilling above about 650° F. (340° C.) forming a so-called atmospheric residuum. This residuum, and similar oils which cannot be distilled at atmospheric pressure without undergoing some thermal cracking, are herein characterized as "substantially nonvolatile." In general, a residual oil is composed of fairly high molecular weight material of very complex chemical character, and contains a large portion of the total nitrogen and sulfur of the whole crude. It also contains all of the metals in the crude. Because of its nature, the residual fraction is generally considered of low value and may be disposed of as bunker fuel for ships, for example. In some refineries, the residual oil is distilled under vacuum to reduce its volume somewhat and recover a vacuum gas oil which may be blended or processed further. In other instances, a portion or all of the residuum may be pyrolyzed (i.e. coked) to recover a coker gas oil and a solid coke which may be marketed or used as fuel. None of these alternative uses for residual oil is particularly attractive economically, and for this reason considerable research has been done to discover ways to convert residual oil to gasoline and fuel oil. As a first step toward such goal, it has been proposed that the residual oil be demetallized and desulfurized, as exemplified by U.S. Pat. Nos. 3,891,541 to Oleck et al; 3,985,643 to Milstein; and 4,016,067 to Fischer et al. The entire contents of these patents are incorporated herein by reference. This demetallized and desulfurized residual oil is amenable to catalytic cracking or hydrocracking, thereby converting it to gasoline and fuel oil. However, because of the relatively refractory nature of the residual oil, the removal of metals and other contaminants requires high capital investment and operating costs. In brief, it appears that there is still a need for improved processes to convert residual oils to lighter fractions in the gasoline or light fuel oil boiling ranges.

Although the foregoing brief description has been couched in terms of current refinery practice and currently available crude oils, there are naturally occurring heavy oils which today are not produced and processed because it is uneconomic to do so. Such oils may be largely or totally substantially nonvolatile in the sense that that term is used herein. It is contemplated that improved processes such as that described herein pertaining to commercial residual oils would be applicable to such heavy oils.

It is an object of this invention to provide a process whereby a significant portion of a substantially nonvolatile petroleum oil such as a vacuum residuum may be converted to volatile hydrocarbons. It is a further object of this invention to provide a process for upgrading a substantially nonvolatile petroleum oil. It is a further object of this invention to provide a process for reducing simultaneously the amount and the average molecular weight of a substantially nonvolatile petroleum oil with the concurrent formation of a volatile hydrocarbon oil fraction. These and other objects will become evident on reading this entire specification including the claims hereof.

Attention is called to U.S. Pat. No. 3,506,731 issued Apr. 14, 1970 wherein is contained a description of the cracking of paraffins in the presence of aromatic hydrocarbons with mordenite catalyst, with the simultaneous formation of alkyl aromatics. Attention also is called to a publication by A. M. McAfee, Ind. Eng. Chem. 7, p. 737 (1915) in which is described the cracking of gas oil at 550° F. and atmospheric pressure.

BRIEF SUMMARY OF THE INVENTION

It has now been found that a residual petroleum oil may be upgraded by mixing with a volatile aromatic hydrocarbon and treating the mixture with a transalkylation catalyst under conversion conditions, all as more fully described hereinbelow. The conversion results simultaneously in a reduction of the total amount of substantially nonvolatie residual oil and in a reduction in its molecular weight. The conversion also results in an increase in the weight of admixed aromatic hydrocarbon and in an increase of its molecular weight. Following the conversion, the converted mixture may be distilled to recover a volatile hydrocarbon fraction and a residual oil, for example. The amount of residual oil is reduced by at least 10% of its original weight with a corresponding increase in the weight of the admixed aromatic hydrocarbon.

Aside from reducing the amount of residual oil, it is an aspect of this invention that the molecular weight of the residual oil also is reduced during the conversion step, i.e. that the molecules become smaller during the conversion step. Thus, the remaining residual oil is upgraded since smaller molecules generally are less refractory in catalytic processes such as demetallation and desulfurization. The process of this invention results in only very little of the sulfur and nitrogen of the residual oil feed being found in the volatile aromatic hydrocarbon fraction that is formed.

In another aspect of this invention, the process of this invention may be applied to upgrade whole crude oils and topped crudes, in which case the amount of a heavy but distillable fraction boiling below 650° F. at atmospheric pressure is reduced by conversion to a relatively lighter fraction. In such case the added volatile aromatic hydrocarbon need not be separated as such but may be processed with the crude oil.

In yet another aspect of this invention, the feed may be a hydrocarbonaceous solid such as the kerogen separated from shale by demineralizing the latter by known methods.

DETAILED DESCRIPTION OF THE INVENTION

Applicant for this Letters Patent does not wish to be bound by theory. However, it is believed that the discovery on which this invention is based might be explained after the fact by a simple conceptual scheme consistent with experimental findings, and that such an explanation would assist in understanding the nature and scope of this invention and of the description contained herein. It is in this spirit that the following explanation is undertaken.

Heavy petroleum oils in general contain a large fraction of aromatic compounds. This fraction consists of a complex mixture of high molecular weight components, many of which contain condensed aromatic and heteroaromatic rings incorporating sulfur, nitrogen and oxygen atoms in the structure. These components, which may have an average molecular weight of about 900, for example, may be assumed to contain a number of hydrogen-rich aliphatic side chains having from 1 to 20 or more carbon atoms. When a heavy petroleum oil is mixed with benzene, for example, and the mixture treated with aluminum chloride under reflux, it is observed that a volatile mixture of alkylbenzenes is readily formed. Unreacted benzene and the volatile mixture of alkylbenzenes may be separated from the residual oil by distillation. If this is done, it is found that the amount of residual oil recovered is substantially less than that charged, and that its molecular weight has been substantially reduced. From the foregoing, it may be assumed that the postulated hydrogen-rich alkyl side chains of the residual oil have been transferred to the added benzene, i.e. that "transalkylation" has been induced, and that the residual oil which remains has been "dealkylated". It will be recognized by one skilled in the art that the foregoing explanation is most likely an oversimplification of the actual conversion in view of the complexity of the residual oil feed; nonetheless, it is phenomenologically compatible with the results shown below.

The present invention is applicable to any heavy petroleum oil, either naturally occurring as such or separated by distillation, and includes oil and solids derived from commercial petroleum, shale or tar sands. In its preferred form, this invention is applicable to any heavy petroleum oil at least 90% of which distills above about 650° F. at atmospheric pressure, as determined by a True Boiling Point (TBP) distillation. A.S.T.M. method D2892, titled "Distillation of Crude Petroleum", published by The American Society for Testing Materials, Philadelphia, Pa. is incorporated by reference as a guide to suitable apparatus and method for determining the fraction of the heavy oil boiling above about 650° F. (340° C.). A typical feed, such as the vacuum resid of Arab Light crude oil, may further be characterized as having a number average molecular weight of about 1000, and a molecular weight range of about 450° to 2000.

In the method of this invention, the heavy oil is mixed with a volatile aromatic hydrocarbon or a mixture thereof having a boiling point not higher than about 428° F. (220° C.) in the proportion by weight of 0.1 to 10 parts of volatile hydrocarbon per part of heavy oil, and preferably from about 0.5 to about 7 parts per part of heavy oil. Suitable aromatic hydrocarbons include benzene, toluene, o-, m-, p-xylene, ethylbenzene, isopropylbenzene, butylbenzene and mixtures thereof. The preferred mixtures of aromatic hydrocarbons are those which have a boiling point not higher than about 428° F. (220° C.) and consist of at least 50 wt.% of mononuclear aromatic hydrocarbons with less than two alkyl substitutents. For special purposes, such as producing by-product petrochemicals, it is contemplated that heteroatom substituted hydrocarbons such as chlorobenzene, and heterocyclic aromatics such as thiophene, may be used.

The mixture of heavy oil and volatile aromatic hydrocarbon prepared as described above is treated by contact with an acid catalyst such as aluminum chloride at atmospheric or higher pressure up to 250 psig for from about 0.2 to 5 hours at a temperature from about 176° F. (80° C.) to about 660° F. (350° C.). The precise time, pressure and temperature of the treatment, i.e. the reaction conditions, are determined largely by the amount and kind of catalyst used, although the nature of the feed does have some bearing on the required conditions. Two parts of a heavy oil to one part of aluminum chloride, for example, gave a satisfactory conversion when refluxed for 3 hours at about 176° F. (80° C.), whereas with only 0.1 part of aluminum chloride no conversion under the same conditions was noted. In general, the preferred reaction conditions when upgrading a heavy oil are those which are effective to convert at least about 10 wt.% of the substantially nonvolatile portion of the heavy oil charged. This conversion is readily determined by comparing the amount of 650° F.+ residue on distillation of the reacted mixture with that of the heavy oil feed before conversion, as will be evident to those skilled in the art.

Other catalysts that may be used for the purpose of this invention include hydrofluoric acid, mixtures of boron trifluoride and hydrofluoric acid, ferric chloride, titanium tetrachloride, tin tetrachloride, antimony pentachloride, the pentafluorides of arsenic, antimony or phosphorus, or, in general, any catalyst recognized in the art as a Friedel-Crafts catalyst. Included as a useful and highly effective catalyst is trifluoromethane sulfonic acid.

It will be recognized by one skilled in the art that the catalysts recited above all are of relatively low molecular weight and are difficult to separate from the reaction mixture and regenerate for reuse. In a preferred embodiment of the present invention, a solid heterogeneous acidic catalyst is preferred since such a catalyst is readily separated by simple filtration and usually is regenerable in one or more simple steps. Such heterogeneous catalysts include polymeric, organic, insoluble resins such as "Nafion H," a perfluorosulfonic ion exchange resin purchased from E. I. DuPont de Nemours and Co. Also contemplated as within the scope of useful catalysts are the insoluble, acidic inorganic oxides recognized as effective for aromatic alkylation or transalkylation. These include, for example, acid activated clays and silica-alumina cracking catalyst, and in particular the highly active clays described in U.S. Pat. No. 4,193,454 to Goldstein. Also contemplated are the acid forms of certain crystalline aluminosilicate zeolites such as mordenite, ZSM-5, and zeolite beta. In some instances, such as with aluminum chloride, the presence of a small amount of water as cocatalyst is required for maximum activity.

As will be evident from the examples which follow, effective acidic catalysts are found which are of the Lewis acid type (aluminum chloride) and of the Bronsted acid type (trifluoromethane sulfonic acid). The term Friedel-Crafts catalyst, as used herein, embodies both types of acid, consistent with the usage by, for example, George A. Ohlah in the text "Friedel-Crafts Chemistry" John Wiley & Sons, New York (copyright 1973) at page 28 and page 29, which pages are herein incorporated by reference. It is generally recognized, however, that not all acidic catalysts are equally effective for a particular reaction under selected reaction conditions. In the present invention, for example, in which it is desired to conduct the reaction under relatively mild conditions of temperature from about 176° F. (80° C.) to about 660° F. (350° C.), it is in general advantageous to use the stronger Friedel-Crafts catalysts to effect the upgrading of the heavy oil within a practical reaction time.

After conversion, the product mixture may be separated by distillation into a volatile fraction, i.e. a fraction boiling below about 650° F. at atmospheric pressure, or below an equivalent temperature at reduced pressure, and a substantially nonvolatile heavy oil residuum. It will be found, by the method of this invention, that the amount of residuum recovered is at least 10 wt. % and up to 50% or more *less* than the heavy oil charged, the loss being attributable to conversion of the heavy oil by transalkylation. The term "conversion", as used herein, is to be understood to signify such determinable loss, and to further signify that the molecular weight of the recovered heavy oil has been measurably reduced.

The recovered volatile fraction is found to comprise a mixture of aromatic hydrocarbons some of which boil at a temperature at least about 86° F. (30° C.) higher than the aromatic hydrocarbon or mixture added to the heavy oil. This higher boiling fraction is found to consist of alkylbenzenes with some diphenylalkanes present. In general, substantially all of the alkyl groups are found to contain from 1 to about 10 carbon atoms. This recovered volatile fraction may be used as such for heating oil or diesel fuel, or it may be treated by hydrogenation or by other methods known to those skilled in the art to make it more suitable for use as liquid fuel or a component thereof. Alternatively, the recovered volatile fraction may be dealkylated to form a hydrogen-rich non-aromatic fraction suitable for use in gasoline, and the recovered aromatic mixture may be recycled by blending with fresh heavy oil. It is a feature of this invention that the recovered volatile fraction may be used in some instances as petrochemicals feed stock. For example, recovered alkylbenzenes with twelve or more carbon atoms may be sulfonated to form detergents.

Also contemplated as within the scope of this invention is to treat a heavy oil by the method of this invention but in two stages. By this method, the reduced amount of recovered heavy oil from the first stage of treatment may be further converted to produce a lesser amount of converted residuum.

This invention will now be illustrated by specific examples. These examples are given for illustrative purposes only and are not be construed as limiting the scope of the invention as described in the specification and claims. All parts given are by weight unless explicitly stated to be otherwise.

EXAMPLES

The term "resid" or "vacuum resid" used in the examples which follow refers to the residuum fraction (a substantially nonvolatile heavy oil) obtained by the vacuum distillation of Arabian Light crude oil. Such a resid typically has a composition consisting of 10% saturated hydrocarbons, 20% aromatic hydrocarbons, 63% heteroaromatic (sulfur, nitrogen and oxygen heterocyclic) compounds and 7% polar material (basic nitrogen, phenols, etc.). Based on nuclear magnetic resonance analysis ($^1$HNMR and $^{13}$CNMR), it was estimated that the aliphatic chains in the resid contained an average 4 to 5 carbon atoms, and constituted abut 40% to 60% of the resid.

EXAMPLE 1

100 g petroleum vacuum resid, 100 g o-xylene, 50 g aluminum chloride and 0.2 ml water were refluxed at atmospheric pressure for 3 hours. The mixture was quenched with approximately 200 ml water plus ice and 30 g sodium hydroxide. 100 ml toluene was added to make easier the separation of the aqueous layer from the organic layer. The organic layer was filtered and distilled. After the removal of the toluene and xylene, approximately 20 g distillate (initial boiling point approximately 160° C., final boiling point approximately 160° C./1 mm Hg) was obtained. The distillate contains mainly alkyl-xylenes (alkyl $C_1$–$C_{10}$) as identified by gas chromatography and mass spectrometry (GC-MS). The chemical composition and the average molecular weight of the feed and converted resids are given in Table I.

EXAMPLE 2

18 g of converted resid from the experiment described in Example 1, 36 g o-xylene, 0.2 ml water and 9 g aluminum chloride were refluxed at atmospheric pressure for 4 hours; then the mixture was worked up as in experiment #1. 4 g (22% yield) volatile products were obtained by transalkylation. The two successive transalkylations gave 42% yield transalkylated volatile products. Besides alkylbenzenes, dimethyltetralines were observed by GC-MS. The properties of the converted heavy oil obtained in this run are given in Table I.

EXAMPLE 3

To 96 g petroleum vacuum resid in 750 ml water saturated toluene, 50 g aluminum chloride was added. The mixture was refluxed at atmospheric pressure for 3 hours, then worked up as described in Example 1. Approximately 31 g volatile products (bp 100° C./760 mm–200° C./20 mm) were obtained. The distillation resid and a fraction boiling at 190°–200° C. have the properties described in Table II. The lighter fractions contain practically no sulfur as identified by gas chromatography with a sulfur detector.

EXAMPLE 4

To 25 g resid in 25 ml o-xylene, 2.5 g aluminum chloride and about 0.2 ml water were added. No conversion was observed after 2 hours of reflux.

TABLE I (Examples 1 and 2)

| | Elemental Analysis % | | | | | Mol Wt |
|---|---|---|---|---|---|---|
| | C | H | O | N | S | (VPO)* |
| Initial vacuum resid | 85.1 | 10.4 | 0.5 | 0.27 | 4.4 | 1100 |
| Converted Heavy Oil Example 1 | 83.1 | 9.3 | 2.3 | 0.3 | 3.9 | 550 |
| Converted Heavy Oil Example 2 | 85.2 | 8.5 | 1.3 | 0.3 | 3.6 | 450 |

*Vapor phase osmometry

TABLE II (Example 3)

| | Elemental Analysis % | | | | | | % Aromatic Hydrogen |
|---|---|---|---|---|---|---|---|
| | C | H | O | N | S | Mw | |
| Initial resid feed | 85.1 | 10.4 | 0.5 | 0.27 | 4.4 | 1100 | 5.6 |
| Converted resid | 84.9 | 9.0 | 0.5 | 0.58 | 4.4 | 450 | 11 |
| Volatile product bp 190-200° C. | 87.1 | 11.3 | 0.07 | 0.01 | 1.46 | — | — |

EXAMPLE 5

9.85 g Arabian Light Vacuum Resid, 50 ml dry o-xylene and 20 g "Nafion H" were refluxed (144° C.) for 24 hrs. Nafion H is a perfluorosulfonic ion exchanger, a copolymer of tetrafluoroethylene and monomers as perfluoro 3,6 dioxa-4-methyl-7-octensulfonic acid produced by DuPont. The Nafion H was filtered and then the mixture was distilled. Approximately 10% of the resid was transformed in alkylated xylenes. The size of the alkyl chains of the xylenes derivatives is the same as in the case when aluminum chloride is used as catalyst.

EXAMPLE 6

25 g Arabian Light Vacuum Resid, 75 ml dry o-xylene and 6.5 ml trifluoromethane sulfonic acid was refluxed for 6 hrs. at 144° C. The mixture was poured in ice-water, the acid removed and the organic solution separated. A yield of about 34% alkylated products (calculated based on initial weight of resid) was obtained.

EXAMPLE 7

58 g H-form "Amberlist-15", 30 ml dry o-xylene and 5 g Arabian Light Vacuum Resid were refluxed for 2 hrs. (144° C.). Amberlist-15 is a porous, insoluble cation exchange resin based on highly cross-linked polystyrene sulfonic acids. No transalkylation reaction was observed.

EXAMPLE 8

2.5 g kerogen solids separated from Green River Shale by demineralization, 2.5 ml trifluoromethanesulfonic acid and 20 ml o-xylene were refluxed for 18 hours. The mixture was poured over ice and filtered. The organic layer was separated and dried over sodium sulfate. The dealkylated kerogen was washed with aqueous sodium hydroxide to remove associated trifluoromethanesulfonic acid and then it was dried. 1.65 g of dealkylated kerogen were obtained. Thirty-four percent of the initial kerogen yielded transalkylated products.

The elemental analysis and percent aromatic C of the initial and dealkylated kerogen are given in Table III.

TABLE III (Ex. 8)

| | Elemental Analysis - Percent by Weight | | | | Percent Aromatic C Solid State $^{13}C$ NMR |
|---|---|---|---|---|---|
| | C | H | N | S | |
| Kerogen | 75.0 | 9.6 | 2.9 | 2.6 | 24 |
| Dealkylated Kerogen | 72.3 | 8.1 | 2.3 | 4.0 | 34 |

EXAMPLE 9

25 g Boscan Crude in 75 ml o-xylene and 7 ml trifluorosulfonic acid were refluxed for 18 hours. At the end of the reaction the mixture was poured over a mixture of potassium hydroxide-ice, the organic layer was separated and the unreacted o-xylene removed by distillation. 28 g o-xylene free product were obtained. The molecular size distribution of the treated Boscan Crude was measured by gel permeation chromatography was changed in the favor of lower molecular weight compounds (Table IV). About 3 g o-xylene were incorporated in the transalkylated products.

TABLE IV (Ex. 9)

| Gel permeation Chromatograph Fractions, wt. percent | Initial Boscan Crude | Reaction Product, Ex. 9 |
|---|---|---|
| Light (about $C_9$ to about $C_{16}$) | 23 | 39 |
| Middle (about $C_{16}$ to about $C_{24}$) | 37 | 29 |
| Heavy (about $C_{24}$ and higher) | 40 | 32 |

What is claimed is:

1. A process for converting a heavy substantially nonvolatile petroleum oil which comprises adding 0.1 to 10 parts by weight of one or more light aromatic hydrocarbons per part of heavy oil and contacting said mixture with an amount of Friedel Crafts catalyst for from about 0.2 to 5 hours at a temperature from about 176° F. (80° C.) to about 660° F. (350° C.), said amount of catalyst being effective to convert at least 10 wt.% of said heavy oil to volatile alkylaromatic products.

2. The process described in claim 1 wherein said heavy petroleum oil is such that at least 90% by weight boils above 650° F. (340° C.) at atmospheric pressure.

3. The process described in claim 1 wherein said heavy petroleum oil is the residuum obtained by vacuum distillation of a crude oil.

4. The process described in claim 1 or 2 or 3 wherein said catalyst is aluminum chloride.

5. The process described in claim 1 or 2 or 3 including the step of separating said converted heavy oil and said volatile alkylaromatic products.

6. The process described in claim 1 or 2 or 3 wherein the catalyst is aluminum chloride and including the step of separating said heavy oil and said volatile alkylaromatic products.

7. A process for reducing simultaneously the average molecular weight and the amount of a heavy substantially nonvolatile petroleum oil and producing alkylaromatic hydrocarbons which comprises adding 0.1 to 10 parts by weight of one or more light aromatic hydrocarbons per part of heavy oil and contacting said mixture with an amount of Friedel Crafts catalyst for from about 0.2 to 5 hours at a temperature from about 176° F. (80° C.) to about 660° F. (350° C.), said amount of catalyst being effective to reduce by at least 10% said amount of heavy oil.

8. The process described in claim 7 wherein said heavy petroleum oil is such that at least 90% by weight boils above 650° F. (340° C.) at atmospheric pressure.

9. The process described in claim 7 wherein said heavy petroleum oil is the residuum obtained by vacuum distillation of a crude oil.

10. The process described in claim 7 or 8 or 9 including the step of separating said converted heavy oil and said volatile alkylaromatic products.

11. The process described in claim 7 or 8 or 9 wherein the catalyst is aluminum chloride and including the step of separating said heavy oil and said volatile alkylaromatic products.

12. The process described in claim 7 or 8 or 9 wherein the catalyst is trifluoromethane sulfonic acid and including the step of separating said heavy oil and said volatile alkylaromatic products.

13. The process described in claim 7 wherein said heavy petroleum oil is a shale oil.

14. A process for upgrading a heavy petroleum oil which comprises adding to each part by weight of said heavy oil 0.1 to 10 parts by weight of a light aromatic hydrocarbon and contacting said mixture with an insoluble acidic heterogeneous catalyst at a liquid hourly space velocity of about 0.1 to 10 and at a temperature from about 176° F. (80° C.) to about 660° F. (350° C.) thereby reducing the residuum content of said mixture.

15. The process described in claim 14 wherein at least 90% by weight of said heavy petroleum oil boils above 650° F. (340° C.) at atmospheric pressure.

16. The process described in claim 14 wherein said heavy petroleum oil is the residuum obtained by vacuum distillation of a crude oil.

17. The process described in claim 14 or 15 or 16 wherein said heterogeneous catalyst is Nafion H.

* * * * *